United States Patent [19]

Kaeser

[11] Patent Number: 4,803,838
[45] Date of Patent: Feb. 14, 1989

[54] DIESEL PARTICULATE INFUSION CONTROLLER

[76] Inventor: Henry E. Kaeser, Hillcrest Rd., Elmira, N.Y. 14903

[21] Appl. No.: 137,589

[22] Filed: Dec. 24, 1987

[51] Int. Cl.⁴ .............................................. F01N 3/02
[52] U.S. Cl. ..................................................... 60/288
[58] Field of Search .......................... 60/288, 286, 274

[56] References Cited

U.S. PATENT DOCUMENTS

| | | |
|---|---|---|
| 2,488,563 | 11/1949 | Sills . |
| 3,938,409 | 2/1976 | Vozumi ................................ 74/856 |
| 3,961,478 | 6/1976 | Lange . |
| 3,972,184 | 8/1976 | Warren . |
| 4,450,681 | 5/1984 | Sato et al. . |
| 4,485,621 | 12/1984 | Wong et al. . |
| 4,509,327 | 4/1985 | Enga ..................................... 60/311 |
| 4,538,412 | 9/1985 | Oishi et al. . |
| 4,581,891 | 4/1986 | Usui ..................................... 60/303 |
| 4,677,823 | 7/1987 | Hardy ................................... 60/286 |

*Primary Examiner*—Douglas Hart

[57] ABSTRACT

Disclosed is a system for removing particulates from the exhaust gas of a vehicle internal combustion engine during those times that the emission of such particulates into the atmosphere would be of greatest danger to persons in the vicinity of the vehicle. The system comprises valve means connected to the vehicle exhaust manifold for normally directing exhaust to the atmosphere when in the nonactivated condition. The valve means directs exhaust to a particulate filter when in the activated condition. Means responsive to the starting of the engine activates the valve means for a predetermined period of time. The valve means can also be activated by shifting into reverse gear.

10 Claims, 2 Drawing Sheets

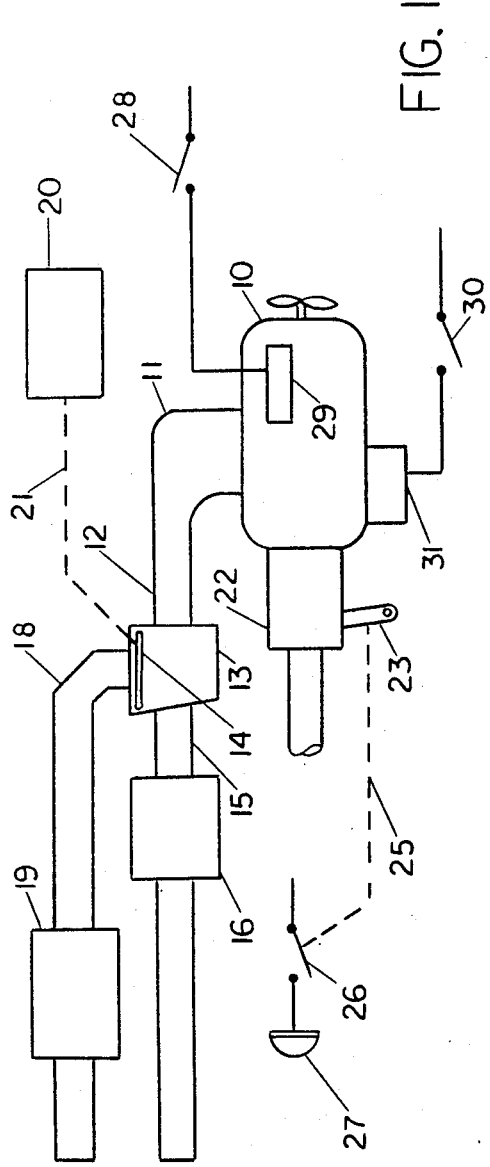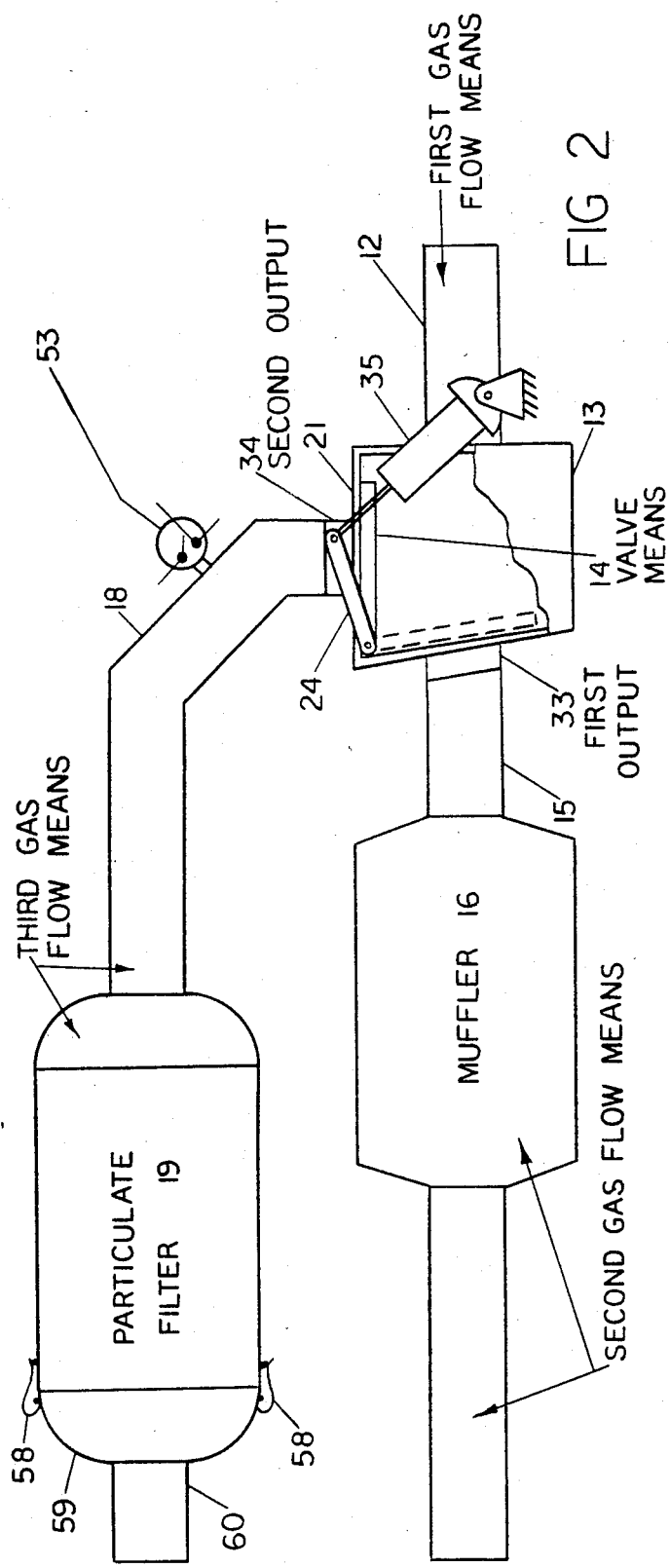

DIESEL PARTICULATE INFUSION CONTROLLER

BACKGROUND OF THE INVENTION

1. Field of the Invention

This invention relates to a system for removing particulates from the exhaust gas of internal combustion engines in motor vehicles. More particularly, this invention relates to a system for removing solid, predominately carbonaceous particulates contained in the exhaust gas of diesel engines only during those times that the emission of such particulates into the atmosphere would be of greatest danger to persons in the vicinity of such vehicles.

Diesel engine exhaust gas contains considerable amounts of exhaust particulates. Various kinds of filters or trapping devices have been employed for removing such particulates. However, a typical diesel engine may emit on the order of a gallon of particulate in 1,000 miles of continuous operation After a sufficient amount of particulate has been trapped, the resultant backpressure adversely affects the operation of the engine. Vehicles which utilize filter elements for trapping exhaust particulates must therefore employ means for dealing with this problem.

2. The Prior Art

There have been proposed a number of diesel exhaust gas cleaning devices which include filter regeneration means. Disclosed in U.S. Pat. Nos. 4,450,681, 4,485,621 and 4,538,412 are filter regeneration systems comprising various means for igniting and burning the trapped exhaust particulates. Such regeneration systems conventionally include valve means for by-passing at least a portion of the exhaust gas during at least a portion of the regeneration cycle. In general, regeneration techniques have been subject to one or more of the following disadvantages which have precluded the commercial acceptance thereof: (1) there may be an inability of the filter element to undergo regeneration so as to maintain effectiveness over long periods, (2) regeneration may reduce the efficiency of the filter element, (3) regeneration may damage the filter element such as by the generation of corrosive gases, and (4) regeneration may produce excessive amounts of harmful by-products such as sulfates.

SUMMARY OF THE INVENTION

It is therefore an object of this invention to provide an exhaust particulate removal system which overcomes the disadvantages of the prior art.

Briefly, the present invention relates to a system for removing particulates from exhaust gas of a vehicle internal combustion engine. The system comprises first gas flow means connected to the exhaust of the engine, and valve means connected to the first gas flow means for normally directing exhaust to a first output when in the nonactivated condition and for directing exhaust to a second output when in the activated condition. Second gas flow means is connected to the valve means first output for exhausting particulate-containing exhaust to the atmosphere. Third gas flow means is connected to the valve means second output for removing exhaust gas particulates before delivering the exhaust gas to the atmosphere. Means responsive to the starting of the engine activates the valve means for a predetermined period of time after the engine has been started. Means responsive to a second condition within the vehicle also activates the valve means.

The means responsive to a second condition may comprise means activated by shifting the vehicle gear means into reverse gear for activating the valve means while the vehicle is in reverse gear, the valve means remaining activated for the predetermined period of time after the gear means has been shifted out of reverse gear. The vehicle operator can also operate the valve means by closing a switch. The means for activating the valve means can be disabled by switch means which detects the backpressure in the exhaust system.

BRIEF DESCRIPTION OF THE DRAWINGS

FIG. 1 is a schematic view of an engine provided with a system for removing exhaust gas particulates in accordance with the present invention.

FIG. 2 is a schematic view showing a preferred system for purifying exhaust gases.

DESCRIPTION OF THE PREFERRED EMBODIMENT

Figure 3:
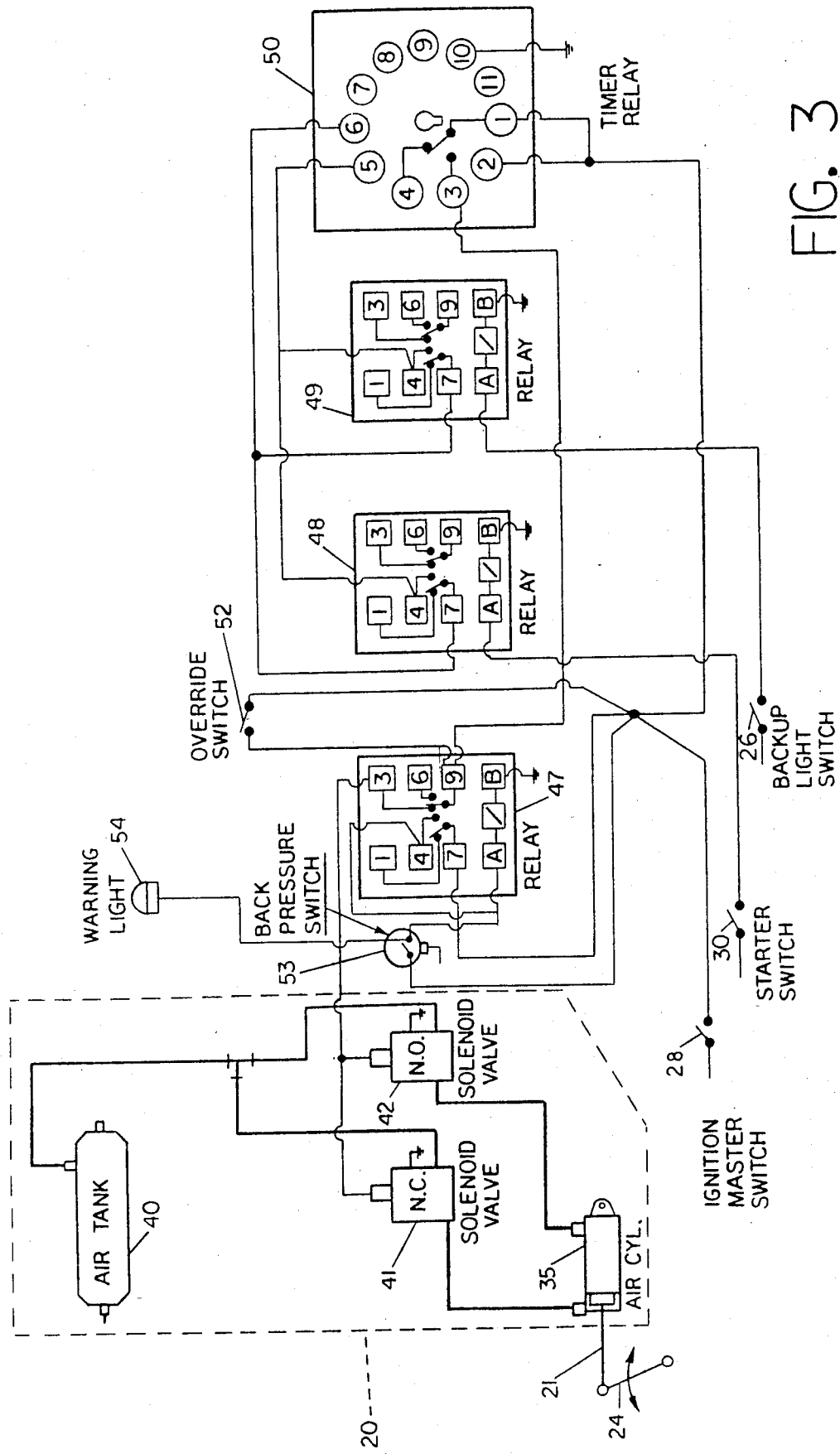
FIG. 3 is a schematic diagram of a control circuit for activating the exhaust diverter valve of FIG. 1.

In FIG. 1 exhaust manifold 11 of diesel engine 10 is connected to a first gas flow conduit 12. Whereas a diesel engine is specifically described herein, the present invention is also useful in connection with other engines. For example, a gasoline engine having worn rings may exhaust a sufficient amount of particulate matter to warrant use of this system. Changeover valve 14 is located in housing 13 which is connected to conduit 12. The valve normally connects exhaust gas to second exhaust gas conduit 15 in which muffler 16 is located. When in the activated condition, valve 14 switches the exhaust gas flow to third gas flow conduit 18 in which filter or particulate catching means 19 is located. Dashed line 21 indicates the mechanical connection between valve 14 and valve actuating means 20.

Attached to engine 10 is transmission 22 from which control lever 23 extends. Dashed line 25 represents a mechanical connection between lever 23 and backup switch 26 which activates backup light 27 when transmission 22 is shifted into reverse. Switch 28 connects battery voltage to engine ignition system 29, and starter switch 30 connects battery voltage to starter 31.

Referring to FIG. 2, gas conduit 12 is connected to changeover valve housing 13 having a first outlet passage 33 and a second outlet passage 34. Outlet passage 33 is connected to muffler 16 by conduit 15, and outlet passage 34 is connected to particulate filter 19 by gas conduit 18. Disposed within housing 13 is a valve 14 which is shown in its normal position, whereby gas from conduit 12 exits from outlet passage 33. Activation of air cylinder 35 pulls lever 24, thus causing valve 14 to move to its activated position shown by dashed lines, whereby gas from conduit 12 exits from outlet passage 34. It is noted that air cylinder plunger rod 21 is represented by the dashed line mechanical connection in FIG. 1.

Referring to FIG. 3, air tank 40 supplies air to solenoid valves 41 and 42 which control the flow of air to opposite ends of air cylinder 35. Valve 41 is a three way normally closed valve, and valve 42 is a three way normally open valve. Thus, air cylinder plunger rod 21 is normally extended. This places valve 14 in its normal position shown in FIG. 2. The combination of tank 40 valves 41 and 42 and cylinder 35 constitutes valve activating means 20 of FIG. 1. Although an air cylinder-operated changeover valve may be advantageous on those trucks which already contain compressed air tanks, other suitable activating means such as an electrically powered system may be employed.

Also shown in FIG. 3 is the electrical control system, the output of which controls valve activating means 20. This system comprises relays 47, 48 and 49 and a timer relay 50. The following commercially available parts may be employed for the aforementioned relays: Part No. 700-HB-33Z12 for relays 47, 48 and 49 and Part No. 700-HT-22BZ12 for timing relay 50, all of which are manufactured by Allen-Bradley Company. Ignition master switch 28 connects the battery voltage to terminal 7 of relay 47 and to terminals 1 and 2 of timer relay 50. Switch 28 also connects battery voltage to override switch 52, which may be located on the dashboard, and to a backpressure switch 53, which is located in conduit 18. A dash-mounted warning light 54, which is connected to switch 53, signals the activation of that switch. When closed, switch 53 connects battery voltage to terminals A and 4 of relay 47. In its closed condition, switch 52 connects battery voltage to terminal 9 of relay 47.

In order to describe the operation of the aforementioned system, it will be assumed that the system is installed on a fire truck. As soon as an alarm is sounded, the engine is started. Some minimum amount of time is required for the firemen to get ready and get on the truck. Thus, there is a minimum predetermined time period between the starting of the truck and the time that the truck leaves the fire station. If a conventional muffler exhaust system were employed on the truck, carbon particulates and the like would exhaust into the station, thus presenting a danger to those working therein. If particulate catching means were permanently installed on the truck, it would become saturated after an average of twenty hours of operation. It is impracticable to replace the particulate trap every twenty hours of operation. Particulate traps having regeneration means suffer a number of disadvantages as discussed above. The system of FIGS. 2 and 3, as operated in the following manner, solves the aforementioned dilemma.

Timer relay 50 is programmed such that, after it is activated by either relay 48 or 49, it remains closed for the predetermined time period. When starter switch 30 is closed, current supplied to normally open relay 48 closes that relay. Terminals 4 and 7 of relay 48 close, thereby interconnecting terminals 5 and 6 of timer relay 50. Also, the normally open timer relay 50 closes, thereby connecting terminals 1 and 3. Current will now pass through the timer relay and through the normally closed relay section of relay 47 (through terminals 3 and 9 thereof) to solenoid valves 41 and 42. The solenoid valves being thus activated, air cylinder plunger rod 21 retracts, placing exhaust changeover valve 14 in its activated condition. The exhaust system is placed in the filter mode whereby exhaust gas is diverted through particulate filter 19. When starter switch 30 opens, terminals 4 and 7 of relay 48 are disconnected, thus starting the predetermined period of time during which timer relay terminals 1 and 3 are connected. At the end of said predetermined time period, timer relay 50 opens, thereby deactivating solenoid valves 41 and 42. The plunger of air cylinder 35 returns to its normal position, and valve 14 returns to the position shown in FIG. 2. The particulate-containing exhaust gas again passes through muffler 16 to the atmosphere. By this time, however, the truck has left the station.

When the fire truck backs into the fire station, it could again subject personnel working therein to particulate-containing exhaust gases. However, when the vehicle is placed in reverse, backup light switch 26 closes and activates relay 49. This normally open relay closes, thereby interconnecting terminals 5 and 6 of the timer relay. This closes the timer relay, connecting terminals 1 and 3 thereof, and causes current to pass through relay 47, as described above, to activate solenoid valves 41 and 42 and place the exhaust system in the filter mode. When the transmission is shifted out of reverse, switch 26 opens and the timer clock in relay 50 begins to run. The exhaust system then remains in the filtered position for the predetermined period of time. This gives some time during which the transmission may be placed in neutral or park position in case the engine is not immediately turned off.

Override switch 52 places the exhaust system in the filter mode at any time by overriding the timer relay. When closed, it connects the battery voltage directly to terminal 9 of relay 47. Switch 52 may be located on the dashboard, the control box housing the relays or in any other remote location. Switch 52 may be employed, for example, if the truck drives up to the garage and pulls in forward. As soon as the driver begins to pull into the garage, he closes switch 52.

It can be seen that particulate filter 19 accumulates relatively little particulate material per hour of total operating time. However, the filter eventually accumulates enough particulate to create a sufficient backpressure in the vehicle exhaust system to close switch 53. The resultant flow of current to terminal A causes the normally open section of relay 47 to close. This allows current to flow to terminal 7 of relay 47, through terminal 4, and back to terminal A, to apply a hold current to relay 47 after the backpressure switch opens due to a reduction in back pressure. Also, the normally closed section of relay 47 opens, thereby placing the exhaust system in muffler mode, regardless of the condition of relays 48 and 49. Since it is only infrequently that filter 19 accumulates sufficient particulate to actuate backpressure switch 53, the replacement of full traps is no longer impracticable. After the actuated warning light 54 is observed, arrangements are made to have the particulate filter replaced. In the embodiment shown in FIG. 2, this is accomplished by opening clamps 58 which are located at the outlet end of the casing of filter 19. After end portion 59 and tailpipe 60 are removed, the filter means is removed from the casing. A new or cleaned filter means is inserted, and elements 59 and 60 are reattached.

Various modifications can be made to the described embodiment without departing from the scope of the invention. For example, the override switch may be a pushbutton switch that momentarily closes and then opens when released. Such an override switch could be employed to activate the timer relay so that the valve means is activated for the predetermined time after the switch is operated. The vehicle operator would merely touch the pushbutton switch as the vehicle begins to pull into a garage. The exhaust system would be in the filter mode for the predetermined time which would be of sufficient length to permit the vehicle to be parked and the engine turned off.

I claim:

1. A system for removing particulates from exhaust gas of a vehicle internal combustion engine comprising
   first gas flow means connected to the exhaust of said engine,
   valve means connected to said first gas flow means for normally directing exhaust to a first output when in the nonactivated condition and for directing exhaust to a second output when in the activated condition,
   second gas flow means connected to said valve means first output for exhausting particulate-containing exhaust to the atmosphere,
   third gas flow means connected to said valve means second output for removing exhaust gas particulates before delivering said exhaust gas to the atmosphere,
   means responsive to the starting of said engine for activating said valve means for a predetermined period of time, and
   means responsive to a second condition within said vehicle for activating said valve means.

2. A system in accordance with claim 1 further comprising gear means including a reverse gear connected to said engine, said means responsive to a second condition comprising means activated by shifting said gear means into reverse gear for activating said valve means, said valve means remaining activated for said predetermined period of time after said gear means has been shifted out of reverse gear.

3. A system in accordance with claim 1 wherein said means responsive to a second condition comprises an override switch and means responsive to the closing of said override switch for activating said valve means.

4. A system in accordance with claim 3 wherein said override switch comprises a switch that closes when touched and opens when released, and said means responsive to the closing of said override switch activates said valve means for said predetermined period of time after said override switch has been released.

5. A system for removing particulates from exhaust gas of a vehicle internal combustion engine comprising
   first gas flow means connected to the exhaust of said engine,
   valve means connected to said first gas flow means for normally directing exhaust to a first output when in the nonactivated condition and for directing exhaust to a second output when in the activated condition,
   second gas flow means connected to said valve means first output for exhausting particulate-containing exhaust to the atmosphere,
   third gas flow means connected to said valve means second output for removing exhaust gas particulates before delivering said exhaust gas to the atmosphere,
   valve activating means for changing the condition of said valve means from said nonactivated to said activated condition upon receipt of a control signal,
   means responsive to the starting of said engine for supplying to said valve activating means a control signal for a predetermined period of time,
   gear means including a reverse gear connected to said engine,
   means activated by shifting said gear means into reverse gear for supplying a control signal to said valve activating means, said control signal continuing for said predetermined period of time after said gear means has been shifted out of reverse gear.

6. A system for removing particulates from exhaust gas of a vehicle internal combustion engine comprising
   first gas flow means connected to the exhaust of said engine,
   valve means connected to said first gas flow means for normally directing exhaust to a first output when in the nonactivated condition and for directing exhaust to a second output when in the activated condition,
   second gas flow means connected to said valve means first output for exhausting particulate-containing exhaust to the atmosphere,
   third gas flow means connected to said valve means second output for removing exhaust gas particulates before delivering said exhaust gas to the atmosphere,
   valve activating means for changing the condition of said valve means from said nonactivated to said activated condition upon receipt of a control signal,
   gate means having an output terminal connected to said valve actuating means, an input terminal and an inhibiting signal terminal, said gate means connecting a control signal from said input terminal thereof to said valve actuating means except when a signal is applied to said inhibiting terminal,
   means responsive to the starting of said engine for supplying to said gate means input a control signal for a predetermined period of time, and
   means responsive to the sensing of an excessive backpressure in said engine exhaust for applying a signal to said gate means inhibiting terminal.

7. A system in accordance with claim 6 wherein said means responsive to the starting of said engine comprises timer relay means having a first pair of terminals, said timer relay means connecting a voltage to said gate means input terminal during the time that said first pair of terminals is interconnected and for said predetermined period of time after said first pair of terminals has been disconnected, and first relay means for interconnecting said first pair of terminals in response to the starting of said engine.

8. A system in accordance with claim 7 further comprising gear means including a reverse- gear connected to said engine, and means for supplying a control signal to said gate means during the time that said gear means is in reverse gear and for said predetermined period of time after said gear means has been shifted out of reverse gear.

9. A system in accordance with claim 8 wherein said means activated by shifting said gear means comprises second relay means for interconnecting said first pair of terminals during the time that said gear means is in reverse gear and for said predetermined period of time after said gear means has been shifted out of reverse gear.

10. A system in accordance with claim 6 further comprising gear means including a reverse gear connected to said engine, and means for supplying a control signal to said gate means during the time that said gear means is in reverse gear and for said predetermined period of time after said gear means has been shifted out of reverse gear.

* * * * *